United States Patent [19]

Wendt

[11] Patent Number: 4,674,335

[45] Date of Patent: Jun. 23, 1987

[54] OIL PRESSURE SENSOR

[75] Inventor: David L. Wendt, Janesville, Wis.

[73] Assignee: SSI Technologies, Inc., Janesville, Wis.

[21] Appl. No.: 830,769

[22] Filed: Feb. 19, 1986

[51] Int. Cl.$^4$ .............................................. G01L 7/16
[52] U.S. Cl. ........................................ 73/745; 73/707
[58] Field of Search ................. 73/745, 744, 707, 722; 417/63; 116/267

[56] References Cited

U.S. PATENT DOCUMENTS

| | | | |
|---|---|---|---|
| 3,125,062 | 3/1964 | Raupp et al. | 116/267 |
| 4,160,204 | 7/1979 | Holmgren et al. | 324/267 |
| 4,175,443 | 11/1979 | Schneider et al. | 73/722 |
| 4,311,436 | 1/1982 | Hendriks | 417/63 X |
| 4,523,476 | 6/1985 | Larner | 73/744 |

FOREIGN PATENT DOCUMENTS

| | | | |
|---|---|---|---|
| 0197711 | 12/1977 | U.S.S.R. | 73/707 |
| 0832370 | 7/1979 | U.S.S.R. | 73/707 |

OTHER PUBLICATIONS

Displacement Measuring System, Kaman Measuring Systems, Technical Data KD-2300 Series TD 282, and KD-2310 & KD-2350 Series, 1982, Kaman Instrumentation Corporation, P.O. Box 7463, 1500 Garden of Gods Road, Colorado Springs, Colo. 80933-7463.
High Temperature Displacement Transducer, HTDT-2-83, Kaman Instrumentation Corporation, P.O. Box 7463, 1500 Garden of the Gods Road, Colorado Springs, Colo. 80933-7463.
KD-2810 Series Displacement Measuring System, Series TD 8210, 1982, Kaman Instrumentation Corporation, P.O. Box 7463, 1500 Garden of the Gods Road, Colorado Springs, Colo. 80933-7463.
General Application Considerations, Inductive Displacement Measuring Systems, Application Note No. 108 382, 1982, Kaman Instrumentation Corporation, P.O. Box 7463, 1500 Garden of the Gods Road, Colorado Springs, Colo. 80933-7463.
Kaman's New Electronic Alignment System, Kaman Measuring Systems KD-2700 SEries TD 382, 1982, Kaman Instrumentation Corporation, P.O. Box 7463, 1500 Garden of the Gods Road, Colorado Springs, Colo., 80933-7463.
KD-4000 Displacement Measuring Systems, Technical Data KD-4000 Systems, Kaman Instrumentation Corporation, P.O. Box 7463, Colorado Springs, Colo. 80933-7463, 1984.
KD-5100 Series Differential Measuring Systems, P.O. Box 7463, 1500 Garden of the Gods Road, Colorado Springs, Colo. 80933-7463.
Proximity Measuring System Model KD-2400, PMS382, Kaman Instrumentation Corporation, P.O. Box 7463, 1500 Garden of the Gods Road, Colorado Springs, Colo.80933-7463.
"Oil Pressure Safety Controls", Copeland Application Engineering Bulletin AE-1095-R9, Sep. 1, 1981.
"Successful Steps to Seal Technology", Bal Seal Engineering Company, Inc., 620 West Warner Avenue, Santa Ana, Calif. 92707-3398.
Installation Data LG3321 Series, Lube Oil Protection, Robertshaw Controls Co. Uni-Line Division, P.O. Box 2000, 4190 Temescal Street, Corona, Calif. 91720, Form No. 1-285, Nov. 1978.
Robertshaw LG Series Gard-Pal IV, Sold State Oil Protection Controls, Robertshaw Controls Company, Appliance Controls Marketing Group, 155 Hill Street, Milford, Conn. 06460.
Underwriters Laboratories Inc., Recognized Component Directory, Mar. 1985, Section SDFY2 Refrigeration Accessories Controllers.

Primary Examiner—Daniel M. Yasich
Attorney, Agent, or Firm—Andrus, Sceales, Starke & Sawall

[57] ABSTRACT

A low oil pressure sensor (32) is provided for direct mounting to a lubrication pump (4) for direct sensing of differential pump pressure. An internal sensor body portion (40) is exposed to the internal pump environment and has a magnetically permeable piston (48) axially slideable therein. High and low pressure aperture ports (56 and 50) through the internal sensor body sidewalls communicate respective high and low pressure sides of the pump to respective axial ends (58 and 54) of the piston. A radial gap (60) between the piston (48) and the interior sidewall (62) of the internal body portion provides a long narrow axial damping passage for damping high pressure pulses and transients from the high pressure side of the pump, to prevent false triggering. A magnetic coil (66) in the body detects piston movement according to changed flux linkage.

10 Claims, 5 Drawing Figures

OIL PRESSURE SENSOR

BACKGROUND AND SUMMARY

The invention relates to protective low oil pressure sensor switches for turning off associated machinery to protect same in the event of low oil pressure. The invention particularly arose during development efforts to detect a condition of low oil pressure across the lubrication pump of a refrigeration compressor, though the invention is not limited thereto.

Lack of proper lubrication is a dominant cause of refrigeration compressor failures. This can be caused by a shortage of oil in the system, logging of oil in the evaporator due to insufficient refrigerant velocities, shortage of refrigerant, refrigerant migration or floodback to the compressor crankcase, failure of the oil pump, or improper operation of the refrigerant control devices. To prevent such failures, oil pressure safety controls have been used.

Prior oil pressure safety controls typically are provided by a tee fitting on the oil pump pressure port with a Schrader valve in the branch connection. A high pressure capilliary connection is provided to the tee run connection by long copper tubing typically wound in a coil. The Schrader valve allows a service man to check the oil pump outlet pressure while the system is in operation without disturbing the oil pressure safety control connections. The low pressure side of the pump is sensed via the crankcase through a connection provided by a long copper tube which is also coiled. An oil pressure control operates on the difference between the oil pump outlet pressure (high pressure side of the pump) and the crankcase pressure (low pressure side of the pump) which is the net or differential oil pump pressure. Mechanical contacts typically provide a switching function in response to a given pressure differential. Current relays and the like may provide delays as necessary to prevent false tripping or afford hysteresis as desired. The long coiled copper tubing provides a damping function for damping high pressure pulses and transients from the high pressure side of the pump, to prevent false triggering.

As an example, a Copeland Part No. 085-0062-00 refrigeration compressor may use a Penn Model No. P45NCA-12 or a Ranco Model No. P30-5826 or a Robertshaw Model No. PD21-2502 oil pressure safety control, as noted in Copeland Application Engineering Bulletin AE-1095-R9, Sept. 1, 1981, which also notes other part numbers and model numbers.

The present invention addresses the particular problems to be overcome in a low oil pressure sensor directly mounted on the pump body and directly inserted into and across the high and low pressure sides of the pump to sense differential pump pressure. The violent pressure fluctuations and high pressure surge pulses must be withstood without false triggering. Furthermore, since the sensor is exposed to the harsh internal pump environment, reliability is a significant consideration, especially longevity and possible contamination of prior mechanical contacts. Furthermore, an extremely compact design is required because of the space limitations of direct internal pump sensing.

A variety of engineering problems were thus presented. The sensor must have a durability that outlives the compressor system. The sensor must be contained in a very small package. The sensor must live in an environment that is hostile to numerous materials. The sensor must be insensitive to dynamic pressure transients and respond only to mean pressure conditions while still maintaining a low level hysteresis.

In an initial effort, a simple mechanical switch was tried and failed. The fluid medium, differential measurement, vibration and dynamic pressure conditions virtually eliminated the use of any type of sensor that uses a mechanical contact or variable resistor.

The desired life span and fluid media eliminated the use of a diaphragm with resistive strain gauges. Aging of the bonding and track breakage could cause considerable field problems.

The small package size prohibits the use of signal conditioning and compensation that is required for piezo-resistive, ceramic capacitive diaphragm and silicon diaphragm technologies. Furthermore, these types are not cost effective at current technology levels.

The use of optical sensing is not practical due to the possibility of contaminated oil.

A Hall effect sensor was ruled out because ferrous contamination would cause problems with the magnet.

The best solution to the sensing problem appeared to be some form of electromagnetic sensor, and from this premise the present invention evolved and has been developed to its current form. The invention provides a solution to a difficult control problem and satisfies the above constraints. A durable, highly reliable sensor is provided in a very small package for direct mounting to the pump body and insertion directly into and across the high and low pressure sides of the pump. Internal damping is provided within the small sensor itself to damp high pressure pulses and other rapid pressure variations, without the need for coiled copper tubing and the like. Furthermore, the sensor includes an internal reference for compensating for various surrounding parameters such as temperature.

DETAILED DESCRIPTION

Figure 1:
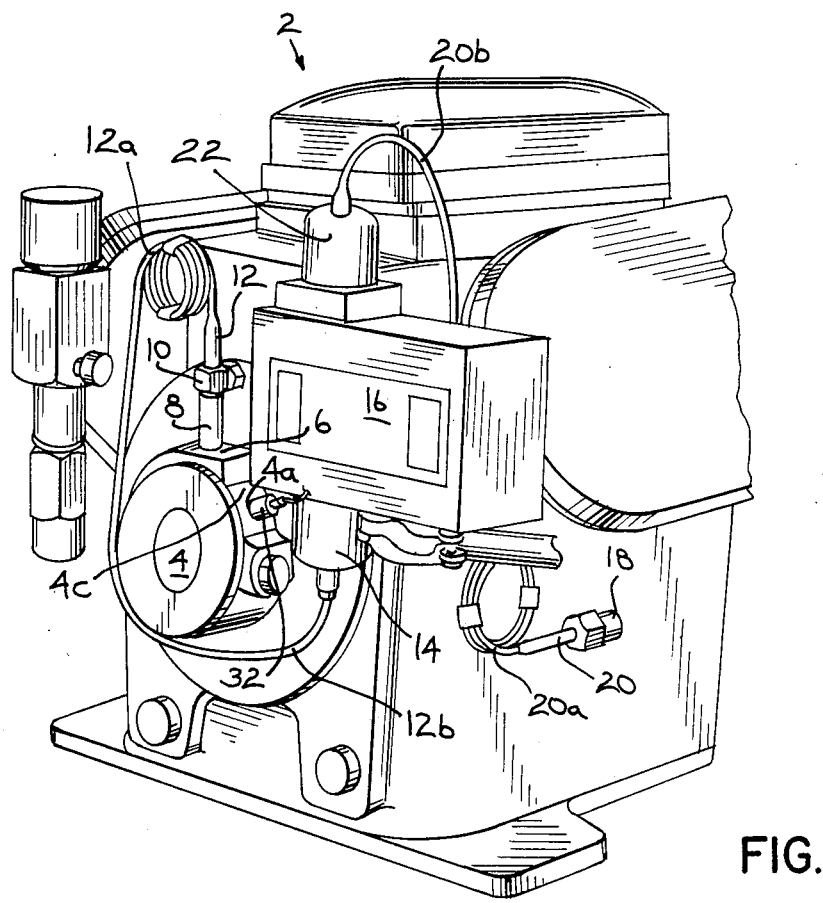
FIG. 1 shows a refrigeration compressor, as known in the art.

FIG. 1 shows a refrigeration compressor 2 known in the prior art, for example as shown in the above noted Copeland Engineering Bulletin. Oil pump 4 has a high pressure port 6 with a tee fitting 8 with a Schrader valve 10 in the branch connection and high pressure copper tubing 12 in the run connection. Copper tubing 12 is coiled at 12a and then extends downwardly and around at 12b to high pressure bellows 14 to communicate the high pressure side of pump 4 to oil pressure safety control 16, such as the above noted Penn, Ramco or Robertshaw models. The low pressure side of pump 4 is sensed through the crankcase at crankcase port connection 18 connected to copper tubing 20 which is coiled at 20a and then extends upwardly and around at 20b and is connected to the low pressure bellows 22 connected to control unit 16. When a given differential pressure is sensed between the high and low sides of the pump, indicating a low oil pressure condition, control 16 turns off compressor 2 to protect the latter.

Figure 2:
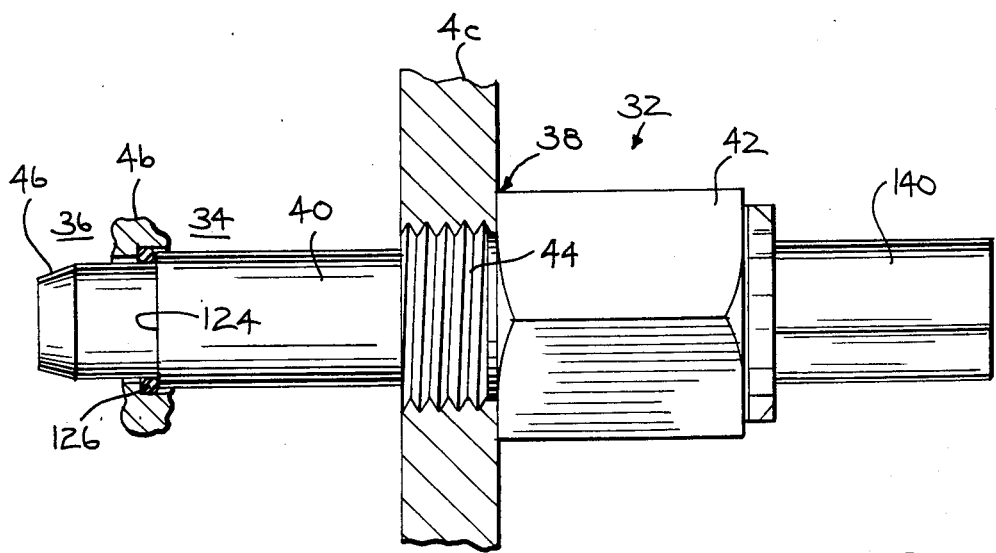
FIG. 2 is an elevation side view of a low oil pressure sensor in accordance with the invention which may be directly mounted to the pump body on the compressor of FIG. 1.
Figure 3:
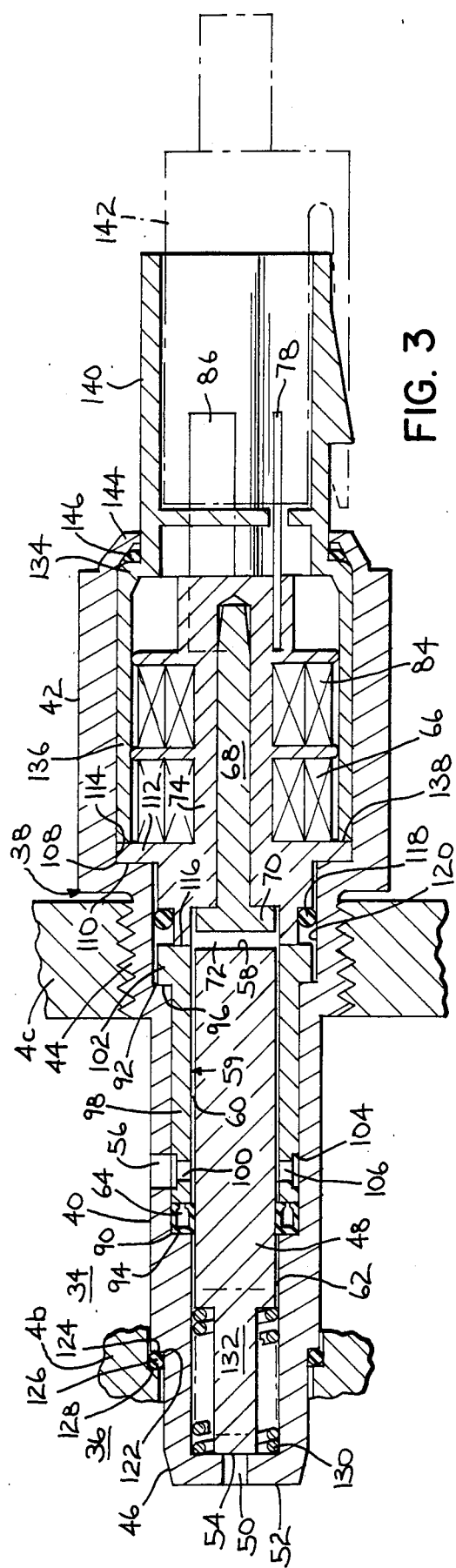
FIG. 3 is a cross sectional view of the sensor of FIG. 2.
Figure 4:
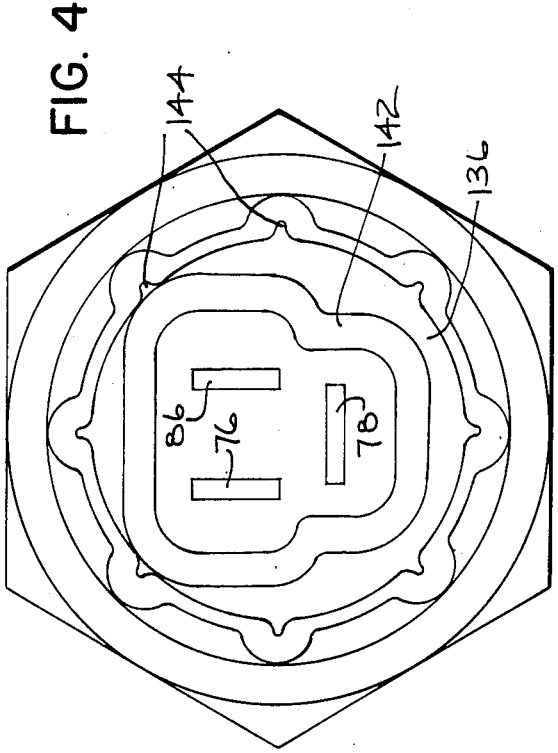
FIG. 4 is an end elevation view of the sensor of FIG. 2.

The present invention provides a low oil pressure sensor 32, FIGS. 2-4, for direct mounting to lubrication pump 4, for example at 4a, and directly inserted into and across the high and low pressure sides 34 and 36 of the pump divided by dividing pump section 4b, to sense differential pump pressure. Sensor body 38 has a first portion 40 disposed internally within pump 4 to be exposed to the internal pump environment, and a second portion 42 extending externally of the pump. Sensor body 38 includes a threaded section 44 between the first internal portion 40 and the second external portion 42 for direct threaded connection to the outer wall 4c of the pump which has a threaded aperture formed therethrough. Outer portion 42 has an exterior perimeter in a hex shape. Internal portion 40 has an external cylindrical shape and a tapered left end leading nose 46.

A magnetically permeable piston 48 is axially slideable left-right within first internal sensor body portion 40. A low pressure port 50 is provided by an aperture formed axially through the left end wall 52 of internal body portion 40 and communicates with the low pressure side 36 of the pump to apply low pressure from the latter to the left axial end 54 of the piston. A high pressure port 56 is provided by an aperture formed radially through the sidewall of body portion 40 and communicating with the high pressure side 34 of the pump to apply pressure from the latter to the right axial end 58 of the piston. Damping means 59 is provided between high pressure port 56 and right axial end 58 of the piston for damping high pressure pulses and transients from the high pressure side 34 of the pump, to prevent false triggering. Piston 48 is a cylindrical member, and the interior sidewall 62 of body portion 40 is also cylindrical and leaves a radial gap 60 to the piston. Damping is provided by the long narrow axial passage formed by radial gap 60, which passage extends from high pressure port radial aperture 56 axially rightwardly through radial gap 60 between piston 48 and interior sidewall 62 to right end 58 of the piston to apply high pressure thereto. Sealing means such as a spring biased seal 64, for example a low friction low pressure reciprocating seal as provided by Bal Seal Engineering Company, Inc., 620 West Werner Ave., Santa Ana, Calif., is provided to the left of radial aperture 56 and radially between piston 48 and interior sidewall 62 to seal and isolate the low pressure on the left of ring 64 from the high pressure on the right of ring 64.

A magnetic coil 66 is mounted in sensor body 38 for generating a flux path including portions extending into the path of movement of piston 48, such that piston movement changes the return coupled flux linkage, which flux change indicates piston movement acording to the above noted pressure differential, which in turn indicates the above noted low oil pressure condition, and which flux change is detected, to be briefly described, to turn off compressor 2, as above. In preferred form, a stationary magnetically permeable core 68 extends axially within coil 66 and has a left end with a radially enlarged head 70 axially facing the right end 58 of piston 48 across a flux gap 72. A non-magnetic bobbin 74 is mounted in sensor body portion 42, and coil 66 is wound around such bobbin. Core 68 is staked or otherwise fixedly mounted within bobbin 74. The coil wire ends are connected to respective terminals 76 and 78 which are staked in the right end of bobbin 74 and extend axially rightwardly therefrom.

Figure 5:
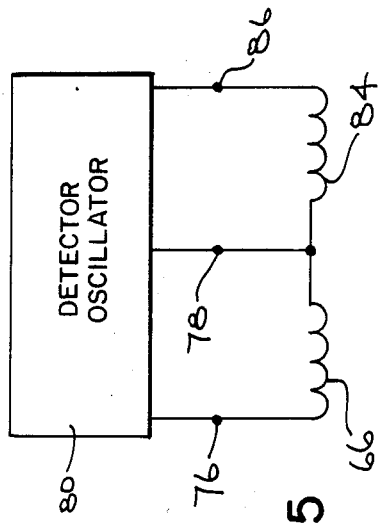
FIG. 5 is a schematic illustration of the sensing and reference coils in the sensor of FIG. 3.

Standard detection circuitry 80, FIG. 5, is used. Alternating current through coil 66 induces an alternating magnetic flux in core 68. The magnetic flux circuit path flows through core 68, across flux gap 72, through piston 48, and back through the sensor body to the right end of core 68. Closing the flux gap 72 by rightward movement of piston 48 increases the flux density and hence the inductance of coil 66. A second reference coil 84 is wound on bobbin 74 to the right of sensing coil 66. The coil wire ends of coil 84 are connected to terminals 86 and 78. Alternating current through coil 84 also induces a magnetic flux in core 68. The same above described magnetic circuit is established through the core, and the closing of gap 72 increases the flux density and thereby increases the inductance of coil 84. The physical location of coil 84 to the right of coil 66 causes a smaller inductance increase in coil 84 than in coil 66 due to the same movement of piston 48 for the same alternating currents through the coils. The position of piston 48 is sensed by monitoring the change in the inductance of coil 66 relative to the inductance of coil 84. Environmental parameters such as temperature are negated since they will affect both coils 66 and 84 equally.

The interior sidewall 62 of sensor body portion 40 has step reductions 90 and 92 in internal diameter forming respective first and second shoulders 94 and 96. Seal 64 is axially stopped leftwardly against shoulder 94. Sensor body portion 40 includes a non-magnetic bushing 98 extending rightwardly from seal 64 and of a radial width substantially equal to the radial height of shoulder 94. Bushing 98 has an aperture 100 therethrough aligned with radial aperture 56 to provide the noted high pressure port. The interior of bushing 98 is spaced from piston 48 by the noted radial gap 60 providing the long narrow axial damping passage. The right end of bushing 98 has a radially enlarged head 102 axially stopped leftwardly against shoulder 96. Bushing 98 has an outer circumferential recessed annulus 104 radially aligned with aperture 56 to communicate with the high pressure side 34 of the pump. Bushing 98 has a plurality of apertures such as 100 and 106 extending radially inwardly from annulus 104 to gap 60.

The interior sidewall of the second body portion 42 has a third step reduction 108 in internal diameter forming a third shoulder 110. Bobbin 74 has a first left end portion 112 axially stopped leftwardly against shoulder 110 and of a diameter substantially equal to the larger diameter 114 of shoulder 110. Bobbin 74 has a further leftwardly extending second left end portion 116 axially stopped leftwardly against the enlarged head right end 102 of bushing 98. An O-ring seal 118 is provided between the left end 116 of the bobbin and the interior sidewall of the sensor body at 120.

The exterior sidewall of sensor body portion 40 has a step reduction 122 in outer diameter forming a shoulder 124. An O-ring seal 126 is axially stopped rightwardly against shoulder 124 upon leftward axial insertion of the sensor body and may mate with a like step shoulder 128 in dividing section 4b to be axially and radially compressed thereagainst to separate and isolate the high and low pressure sides of the pump.

Piston 48 is biased rightwardly by compression spring 130 within sensor body portion 40 spring 130 bears at its left end against left end wall 52 of the body and encircles low pressure port aperture 50, and bears at its right end against piston 48 to bias the latter rightwardly. The piston may include a leftward reduced diameter extension 132 extending axially leftwardly within spring 130 and which may engage left end wall 52 to provide a left end stop for piston movement.

A non-magnetic and electrically insulative shroud 134 includes a left cylindrical portion 136 within sensor body portion 42 and encircling coils 66 and 84 and bobbin 74. Shroud 134 has a left end 138 axially stopped against the largest diameter left end section 112 of the bobbin. Shroud 134 has a right portion 140 around terminals 76, 78 and 86 and extending axially rightwardly therebeyond. Right external shroud portion 140 has a configured perimeter shape as shown in FIG. 4 to provide a keyed orientation fit of an external connector such as 142, shown in dashed line in FIG. 3. The right end of sensor body portion 42 has a slight flange extension which is crimped radially inwardly at a plurality of points along its circumference, as shown at 144, to hold shroud 134 and the remaining internal components in assembled condition. A gasket 146 may be provided around the shroud before the crimping, to afford further sealing.

It is recognized that various equivalents, alternatives and modifications are possible within the scope of the appended claims.

I claim:

1. An oil pressure sensor for direct mounting to a lubrication pump and directly inserted into and across high and low pressure sides of said pump to sense differential pump pressure, comprising:
    a sensor body having a first portion disposed internally within said pump to be exposed to the internal pump environment, and a second portion extending externally of said pump;
    a magnetically permeable piston axially slideable within said first internal sensor body portion;
    a low pressure port in said first internal sensor body portion communicating with said low pressure side of said pump to communicate pressure from said low pressure side of said pump to one axial end of said piston;
    a high pressure port in said first internal sensor body portion communicating with said high pressure side of said pump to communicate pressure from said high pressure side of said pump to the other axial end of said piston;
    damping means between said high pressure port and said other axial end of said piston for damping high pressure pulses and transients from said high pressure side of said pump, to prevent false triggering, said damping means comprising a long narrow axial passage from said high pressure port through the radial gap between said piston and the interior side wall of said first sensor body portion and extending axially to said other end of said piston to apply said high pressure thereto, to provide integral damping within said first internal sensor body portion and to provide said integral damping directly to said moving piston;
    a magnetic coil mounted in said body for generating a flux path including portions extending into the path of movement of said piston, such that piston movement changes the return coupled flux linkage according to said pressure differential.

2. An oil pressure sensor for direct mounting to a lubrication pump and directly inserted into and across high and low pressure sides of said pump to sense differential pump pressure, comprising:
    a sensor body having a first portion disposed internally within said pump to be exposed to the internal pump environment, and a second portion extending externally of said pump;
    a magnetically permeable piston axially slideable within said first internal sensor body portion;
    a low pressure port in said first internal sensor body portion communicating with said low pressure side of said pump to communicate pressure from said low pressure side of said pump to one axial end of said piston;
    a high pressure port in said first internal sensor body portion communicating with said high pressure side of said pump to communicate pressure from said high pressure side of said pump to the other axial end of said piston;
    damping means between said high pressure port and said other axial end of said piston for damping high pressure pulses and transients from said high pressure side of said pump, to prevent false triggering;
    a magnetic coil mounted in said body for generating a flux path including portions extending into the path of movement of said piston, such that piston movement changes the return coupled flux linkage according to said pressure differential;
wherein:
    said piston is a cylindrical member axially slideable left-right;
    said low pressure port is formed proximate the left end of said first internal sensor body portion to communicate said low pressure side of said pump with the left end of said piston;
    said high pressure port is formed at an intermediate section of said first internal sensor body portion and comprises a radial aperture through a sidewall of the latter to communicate said high pressure side of said pump with an intermediate section of said piston;
    said damping means comprises a long narrow axial passage from said high pressure port radial aperture rightwardly through the radial gap between said piston and the interior sidewall of said first sensor body portion and extending to said right end of said piston to apply said high pressure thereto;
    and comprising sealing means to the left of said high pressure port radial aperture and radially between said piston and the interior sidewall of said first sensor body portion to seal and isolate the low pressure on the left from the high pressure on the right.

3. The invention according to claim 2 wherein:
    said sensor body includes a threaded section between said first internal and second external portions for direct threaded connection to said pump;
    said magnetic coil is in said second external body portion;
    and comprising a stationary magnetically permeable core extending axially within said coil and having a left end with a radially enlarged head axially facing the right end of said piston across a flux gap.

4. The invention according to claim 2 wherein:
    said interior sidewall of said first sensor body portion has first and second step reductions in internal diameter forming first and second shoulders, respectively;

said sealing means is axially stopped leftwardly against said first shoulder;

said first sensor body portion includes a non-magnetic bushing extending rightwardly from said sealing means and of a radial width substantially equal to the radial height of said first shoulder and having an aperture therethrough aligned with said first mentioned aperture to provide said high pressure port, the interior of said bushing being spaced from said piston by said damping means long narrow axial passage, the right end of said bushing having a radially enlarged head axially stopped leftwardly against said second shoulder.

5. The invention according to claim 4 wherein said bushing has an outer circumferential recessed annulus radially aligned with said first mentioned aperture to communicate with said high pressure side of said pump, and said bushing has a plurality of said second apertures extending radially inwardly from said annulus to said long narrow axial passage.

6. The invention according to claim 4 wherein:

the interior sidewall of said second sensor body portion has a third step reduction in internal diameter forming a third shoulder;

and comprising a non-magnetic bobbin mounted in said second sensor body portion and around which said coil is wound, said bobbin having a first left end portion axially stopped leftwardly against said third shoulder and of a diameter substantially equal to the larger diameter of said third shoulder, said bobbin having a further leftwardly extending second left end portion axially stopped leftwardly against said enlarged head right end of said bushing.

7. The invention according to claim 6 wherein said low pressure port comprises an axial aperture through the left end wall of said first sensor body portion, and comprising spring means disposed internally within said first sensor body portion and bearing at its left end against said left end wall of said first sensor body portion and encircling said low pressure port aperture, and bearing at its right end against the left end of said piston to bias said piston rightwardly.

8. The invention according to claim 6 comprising an electrically insulative non-magnetic shroud extending leftwardly into said second sensor body portion around said coil and axially stopped leftwardly against said first left end portion of said bobbin, said bobbin having electrical terminal means extending axially rightwardly beyond the right end of said second sensor body portion, and wherein said shroud is also around said terminal means and extends rightwardly therebeyond.

9. The invention according to claim 6 wherein the exterior sidewall of said first sensor body portion has a fourth step reduction in external diameter forming a fourth shoulder, and comprising exterior sealing means axially stopped rightwardly against said fourth shoulder.

10. An oil pressure sensor for direct mounting to a lubrication pump and directly inserted into and across the high and low pressure sides of said pump to sense differential pump pressure, comprising:

a sensor body having a first cylindrical portion disposed internally within said pump to be exposed to the internal pump environment such that upon insertion into said pump said first sensor body portion extends axially leftwardly, said sensor body having a second portion extending axially rightwardly externally of said pump;

a magnetically permeable cylindrical piston axially slideable left-right within said first internal sensor body portion;

a low pressure port formed in said first internal sensor body portion proximate the left end thereof and communicating said low pressure side of said pump with the left end of said piston;

a high pressure port in said first internal sensor body portion comprising a radial aperture through a sidewall of the latter and communicating said high pressure side of said pump with an intermediate section of said piston;

damping means comprising a long narrow axial passage extending from said high pressure port radial aperture axially rightwardly through the radial gap between said piston and the interior sidewall of said first sensor body portion and extending to the right end of said piston to apply high pressure thereto, said long narrow axial passage damping high pressure pulses and transients from said high pressure side of said pump, to prevent false triggering;

sealing means to the left of said high pressure port radial aperture and radially between said piston and the interior sidewall of said first sensor body portion to seal and isolate the low pressure on the left from the high pressure on the right;

a magnetic coil mounted in said body for generating a flux path including portions extending leftwardly into the path of movement of said piston, such that piston movement changes the return coupled flux linkage according to said pressure differential; and a reference magnetic coil mounted in said body to the right of said first magnetic coil and spaced sufficiently rightwardly from said path of movement of said piston such that movement of said piston has minimal affect on return coupled flux linkage of said reference coil.

* * * * *